United States Patent [19]

Demichelis et al.

[11] Patent Number: 4,597,074

[45] Date of Patent: Jun. 24, 1986

[54] MULTICHANNEL INTERFACE LINKING A PCM LINE WITH A PROCESSOR

[75] Inventors: Carlo Demichelis, Turin; Paolo Mancini, S. Maurizio Canavese; Paolo Mattone, Turin, all of Italy

[73] Assignee: CSELT, Centro Studi e Laboratori Telecomunicazioni SpA, Turin, Italy

[21] Appl. No.: 517,849

[22] Filed: Jul. 27, 1983

[30] Foreign Application Priority Data

Jul. 27, 1982 [IT] Italy .................. 67944 A/82

[51] Int. Cl.⁴ ................. H04Q 11/04; H04J 3/00
[52] U.S. Cl. ...................... 370/58; 370/79; 370/99
[58] Field of Search ............ 370/58, 94, 95, 79, 370/99

[56] References Cited

U.S. PATENT DOCUMENTS

| | | | |
|---|---|---|---|
| 4,271,507 | 6/1981 | Gable et al. | 370/79 |
| 4,281,380 | 7/1981 | DeMesa, III et al. | 370/94 |
| 4,322,843 | 3/1982 | Beuscher et al. | 370/58 |
| 4,382,294 | 5/1983 | Beuscher et al. | 370/58 |
| 4,521,882 | 6/1985 | Gabrielli et al. | 370/94 |

OTHER PUBLICATIONS

"Coming of Age: A Long-Awaited Standard for Heterogeneous Nets," by H. C. Folts, Data Communications/Jan. 1981, pp. 63–67.

*Primary Examiner*—Douglas W. Olms
*Assistant Examiner*—Kenneth I. Rokoff
*Attorney, Agent, or Firm*—Karl F. Ross; Herbert Dubno

[57] ABSTRACT

An interface interposed between a PCM data terminal and a processor comprises a bus accessor dialoguing with the processor, input and output circuitry coupled to the terminal, and intervening logic circuits and data stores designed to supply the processor in a time-division mode with preprocessed messages received or to be transmitted over a multiplicity of channels. The interface is operable according to dialogue procedures of HDLC type such as those corresponding to CCITT recommendations X25, X75 and N. 7, with switchover from one protocol to another.

9 Claims, 6 Drawing Figures

MULTICHANNEL INTERFACE LINKING A PCM LINE WITH A PROCESSOR

FIELD OF THE INVENTION

Our present invention relates to data transmission between processors of a communication system of PCM (pulse-code modulation) type and concerns, in particular, a multichannel interface designed to link a processor with a data terminal of a transmission line.

BACKGROUND OF THE INVENTION

In multiprocessor systems of loosely coupled kind operating with digital switching units, in single-processor or multiprocessor systems handling packet switching, and generally when a processor is to exchange messages with a PCM signal path or with other processors, it is necessary to have bidirectional gates enabling data to be transferred from the processor to the signal path and vice versa, according to predetermined dialogue protocols. PCM frames encompassing 32 channels, operating at 64-Kbit/s, are customarily transmitted on any signal path; the No. 0 time slot of a frame normally serves to carry channel addresses and sync signals.

On the one hand it is of interest to dispose of a large number of such paths, e.g. in case of a loosely coupled multiprocessor system operating in the packet-switching domain. In this case each processor needs access gates for the data to be transferred to and from a PCM terminal as well as multichannel routes leading to the other processors. On the other hand, the present state of the art gives rise to numerous problems when the number of such gates is high. In fact, each gate acts as a peripheral unit of a rather complex type for the processor; it must handle the lowest levels of the communication protocol which the processor could not do since that would entail too many repetitive tasks.

Data interchange between the periphery and the processor memory via the usual line multiple or bus can take place in various ways, i.e. by line sensing, interrupt and direct memory access; line-sensing and interrupt procedures may involve storage in the peripheral unit at a byte or a message level, in a memory of FIFO (first in, firt out) or double-access type, all for both transmission directions.

In case of a line-sensing operation a data storage at the byte level in the interface is not very convenient. Thus, the processor must continuously execute tests of data ready and of data received, as well as check on the line conditions; positive tests are then to be followed by an instruction of byte transfer which is a cumbersome procedure when there are many data to be temporarily stored.

When the data are to be stored at the message level, each interface is to be equipped with a memory sufficient to contain two departing and two arriving messages in order to ensure the complete use of a channel. The tests on the arriving messages must then be rather frequent in order to avoid useless waits when the message is short.

With interrupt procedure, if the data to be stored are organized into bytes, it is difficult to meet the interrupt requirements during traffic peaks, whereas if the data are organized into messages, the storage is still burdensome. Test elimination entails the introduction of many interrupt sources, whose number is limited by the processor structure.

With either of the aforedescribed techniques, if a message is to be forwarded through a plurality of output gates, it is to be transferred by the processor into the buffer of each of them; if a message is to transit from one gate to another, it must be first transferred from the input buffer to the memory and from the latter into the output buffer. Furthermore, the output buffer —especially if it is of the FIFO type—cannot hold messages waiting to be checked unless it has a very high storage capacity.

With use of the "direct memory access" technique the storage in the peripheral unit is no longer necessary; this is an advantage, even though for each incoming channel there must be available a suitable memory area assigned from time to time by the processor and ready to receive a possible message. The requests for bus access to be satisfied by the processor are, however, very numerous, especially during peak traffic. Thus, just when the processor is to exhibit the maximum data-handling capacity, it often slackens while also having to control the message buffer even as the number of interrupt sources (or the number of tests to be carried out) necessary for obtaining information relating to the received or transmitted complete messages remains high.

In all these cases, furthermore, there exists no possibility of on-line checking on the proper functioning of the interfaces, but the service has to be interrupted on the respective channel for the duration of such a test.

OBJECTS OF THE INVENTION

The general object of our present invention is to provide a multichannel interface for the purpose described which, operating with time-division multiplexing (TDM), obviates the aforementioned disadvantages.

A more particular object is to provide a PCM/TDM interface which is sufficiently flexible to be selectively operated in accordance with several dialogue procedures, especially those of the HDLC (high-level datalink control) type conforming for example to CCITT Recommendations X25, X27 and N. 7.

A further object is to provide an interface of this kind adapted to supply the processor with preprocessed complete messages received or to be sent out, the interface being designed to accommodate an external bit rate of the usual 2.048 Mbit/s (corresponding to 32 PCM channels of 64 Kbit/s).

It is also an object of our invention to provide a PCM/TDM interface communicating with the processor via a single transfer point, i.e. a double gate with a port for each directional transmission, common to all the channels in order that the processor may see the interface as just another peripheral unit.

SUMMARY OF THE INVENTION

A multichannel interface according to our invention, interposed between a processor and a data line, comprises input and output circuitry coupled with that data line for respectively receiving bits of incoming PCM channels therefrom and transmitting bits of outgoing PCM channels thereto. The interface further comprises memory means having sectors individually assignable to incoming and outgoing channels for temporary storage of bits thereof, access means controlling communication between the memory means and a bus leading to the processor, and microprogrammed operating means for assigning—with time-division multiplexing (TDM)— sectors of the memory means to incoming and outgoing channels and controlling the transfer of outgoing bits from the memory means to the output circuitry and of incoming bits from the input circuitry to the memory means, all in response to instructions from the processor.

Pursuant to a more particular feature of our invention, the microprogrammed operating means includes counting means for determining the number of bits stored during a given time slot in a sector of the memory means, temporarily assigned to the channel to which that time slot is allocated, as well as logic means for recognizing signals that mark the beginning and the end of a message, two events which—along with others described hereinafter—are to be reported to the processor. A message generally consists of one or more words each composed of at least one byte which, in accordance with the usual practice, encompasses eight bits. The last byte of a message might be truncated, however, a fact which would be detected by the counting means.

Still another feature of our invention resides in the provision of an operational logic network in each of the aforementioned circuitries, the network being controlled by a local time base during the processing of a given channel for registering a state word relating to such channel and updating that state word in each bit period of an allocated time slot; the updated state word is transmitted to the processor at the end of each time slot. The logic network advantageously includes a programmable read-only memory (PROM) loadable with a new bit in each bit period, a state register loadable by the PROM, and a feedback connection extending from this register to the PROM. A logic circuit in cascade with the PROM may be switchable during certain time slots of a frame to prevent the generation of a state word when a byte in such a time slot—e.g. those allocated to the No. 0 and No. 16 channels of a 32-channel frame—is to be retransmitted in a "transparent" manner without intervening processing. The input and output circuitries may each further comprise shift-register means with a feedback loop for assembling consecutive bits of a time slot into a byte which is then compared with a predetermined redundancy code in order to enable a checking for possible errors.

Yet a further feature of our invention resides in the provision, as part of the aforementioned operating means, of a read-only memory containing microprograms which conform to different protocols, such as those established by the CCITT Recommendations X25, X27 and N. 7 already referred to; any one of these microprograms may be selected with the aid of a manually settable switch. Reference may also be made to an article titled "Coming of Age: A Long-Awaited Standard for Heterogeneous Nets" by Harold C. Folts, published in Data Communications of January 1981, pages 63–73. That article discusses communication systems of the general type here considered, termed OSI (for open-system interconnection), and describes a multilayered structure whose lowest levels conform to CCITT Recommendation X25.

Thanks to the use of microprogrammed operating means for the TDM preprocessing of all the channels of a frame, there exists in fact a single transfer point through which information can be exchanged between the interface and the bus leading to the processor; the latter, accordingly, can treat that interface as one of several peripheral units under its control. The bus can also constitute a link among a number of such interfaces, e.g. as shown in U.S. Pat. No. 4,521,882, issued June 4, 1985, by Luciano Gabrielli et al. The bus will then further serve for the exchange of high-level information between the processor and other nodes of the system, with establishment of full-mesh loops between processors and branch lines extending via the various interfaces to a number of data terminals intercommunicating, for example, by a packet-switching procedure.

BRIEF DESCRIPTION OF THE DRAWING

The above and other features of our invention will now be described in detail with reference to the accompanying drawing in which.

SPECIFIC DESCRIPTION

The interface described hereinafter is to be located between a processor and a serial 2.048-Mbit/s PCM group; it can handle 32 incoming and outgoing channels such as bidirectional communication paths between a PCM network and the processor; as to the interface, the two transmission directions are independent of each other for each channel.

In the case in which protocols X25, X75 are used, all the 32 channels can be activated at the same time and the interface can handle, in both directions, the maximum traffic compatible with the group capacity.

If, on the contrary, protocol N. 7 is used, the greater complexity of the operations carried out by the interface limits to 16 the bidirectional channels which can be active at the same time. These 16 channels can be chosen in any manner whatever out of the 32 and can be changed, even during the operation, without requiring a new interface initialization.

The changeover from one mode of operation to the other is obtained by acting on a manually operated switch, which selects one of two microprograms present. Another switch allows, in both cases, the transparent mode of operation for channels 0 and 16: in this case, at each PCM frame, the contents of these arriving channels are simply transferred into two fixed locations of the memory, without being acted upon; conversely, the contents of two further fixed locations of the memory are transferred on channels 0 and 16 of each outgoing frame.

Figure 1:
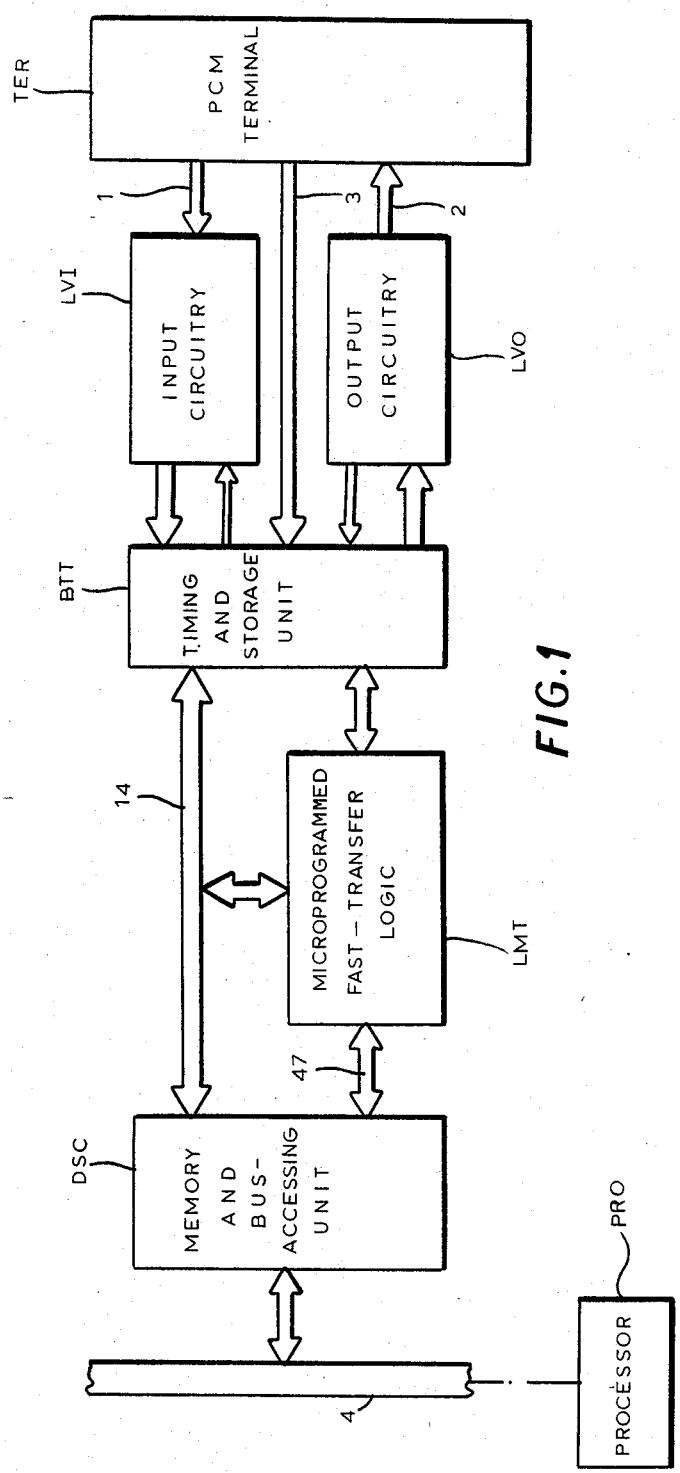
FIG. 1 is an overall block diagram of an improved interface embodying our invention.

The interface consists of five operational blocks DSC, LMT, BTT, LVI and LVO interposed between a processor PRO and a PCM terminal TER as shown in FIG. 1. Before describing their structure in detail, we shall discuss in general terms the operation of the interface as a whole.

Figure 2:
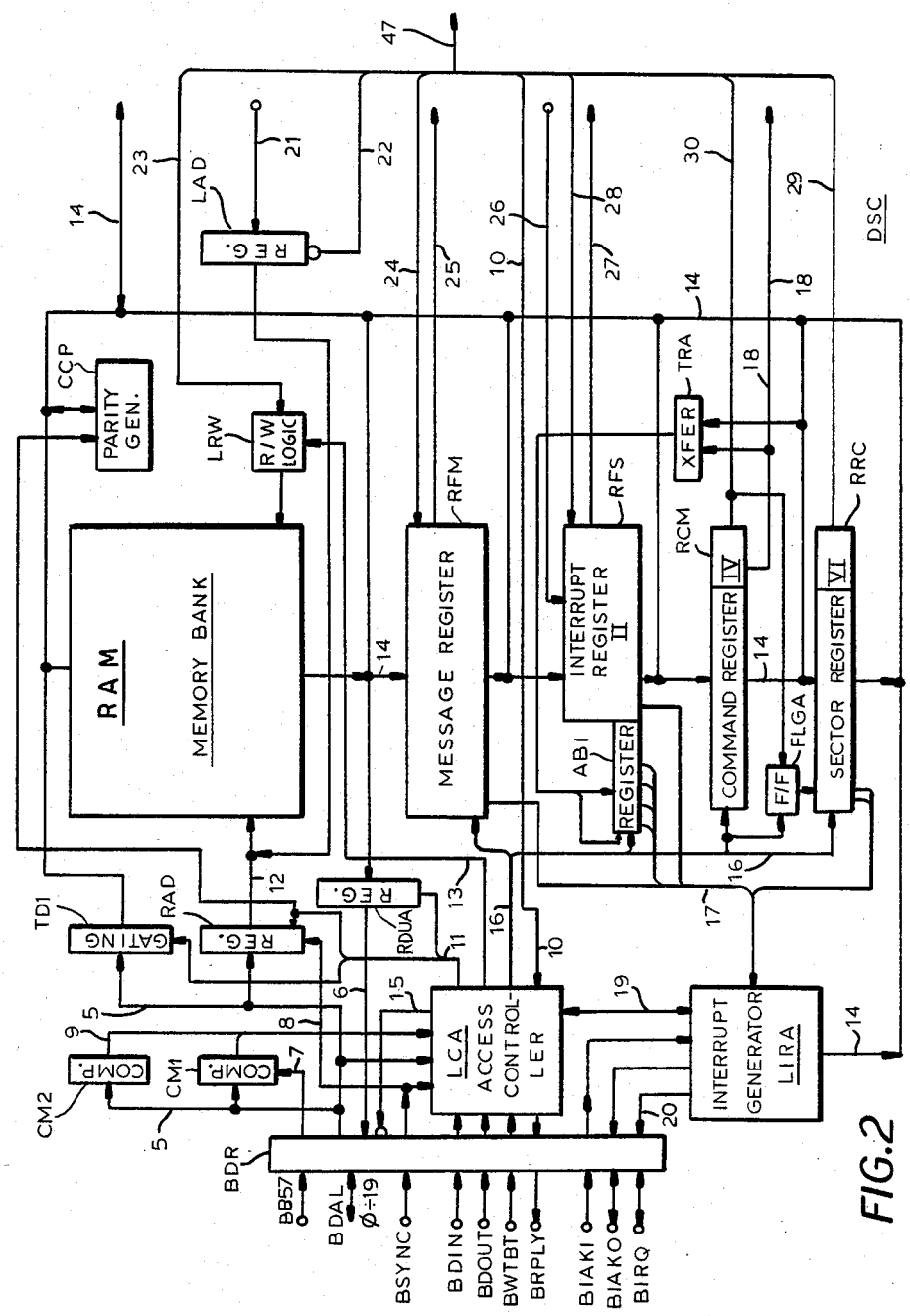
FIGS. 2–6 are more detailed diagrams of several blocks shown in FIG. 1.

Block DSC, more fully illustrated in FIG. 2, is the area of exchange of data, of signals and commands with processor PRO, through a bus 4, and comprises the following circuits:

(a) A fast bi-port memory bank RAM, with time-division access, having a capacity of 32K words; the largest part of the memory assembly is intended for message or packet storage. For this purpose the assembly is conceptually subdivided into sectors into which either an incoming or an outgoing packet or message can be loaded. The remaining part of the memory assembly contains the working tables and the registers of a logic unit which controls the entire bank. The subdivision into sectors and the number of working tables, generated by the interface itself at its initialization, are different for the two types of operation. The message sectors are dynamically assigned to the channels and each of them serves (at different times) for both reception and transmission.

The initial word of the sector contains an identification of the originating channel or the message destination and lists the number of bits the word is composed of. The message within the sector does not contain ancillary elements such as flags, stuffing zeroes or bits of a cyclic redundancy code (CRC).

(b) A data store RFM of the FIFO (first in, first out) type for signaling received or transmitted messages, accessible for reading by the processor as a register of one of its peripheral units and referred to hereinafter as Register 0 of the unit. This register carries the number of the sector by which a message has been transmitted or received, a bit discriminating between reception and transmission, and a code giving the result of the checks performed on the transmission or reception operation.

(c) A FIFO data store RFS with an associated register ABI for signaling state changes of the central logic circuitry on the channels; this component is also seen by the processor as a read-only register and will be referred to hereinafter as Register II.

(d) A register RCM for the commands coming from the processor, referred to hereinafter as Register IV, written only by the processor and carrying the command code thereof along with possible ancillary information (number of sector, number of channel or new state of the interrupt-enabling circuits).

(e) A register RRC of the sectors available to the process and readable only by the latter, referred to hereinafter as Register VI, carrying the number of the sector which, upon request, the interface renders available.

(f) A group LIRA of interrupt generators that are respectively associated with each of the four aforedescribed registers and can be enabled independently by the processor. Each register carries a "data ready" bit while the "data received" bit of Register IV appears in Register VI; the reading of Registers 0 and II (FIFO) automatically cancels the information with the exception of the indication of interrupt enablement which is loaded into Register IV by the processor and is automatically transferred to Register II.

(g) A microprogram-controlled circuit LGA which handles the accessing of the above-described data stores.

Figure 3:
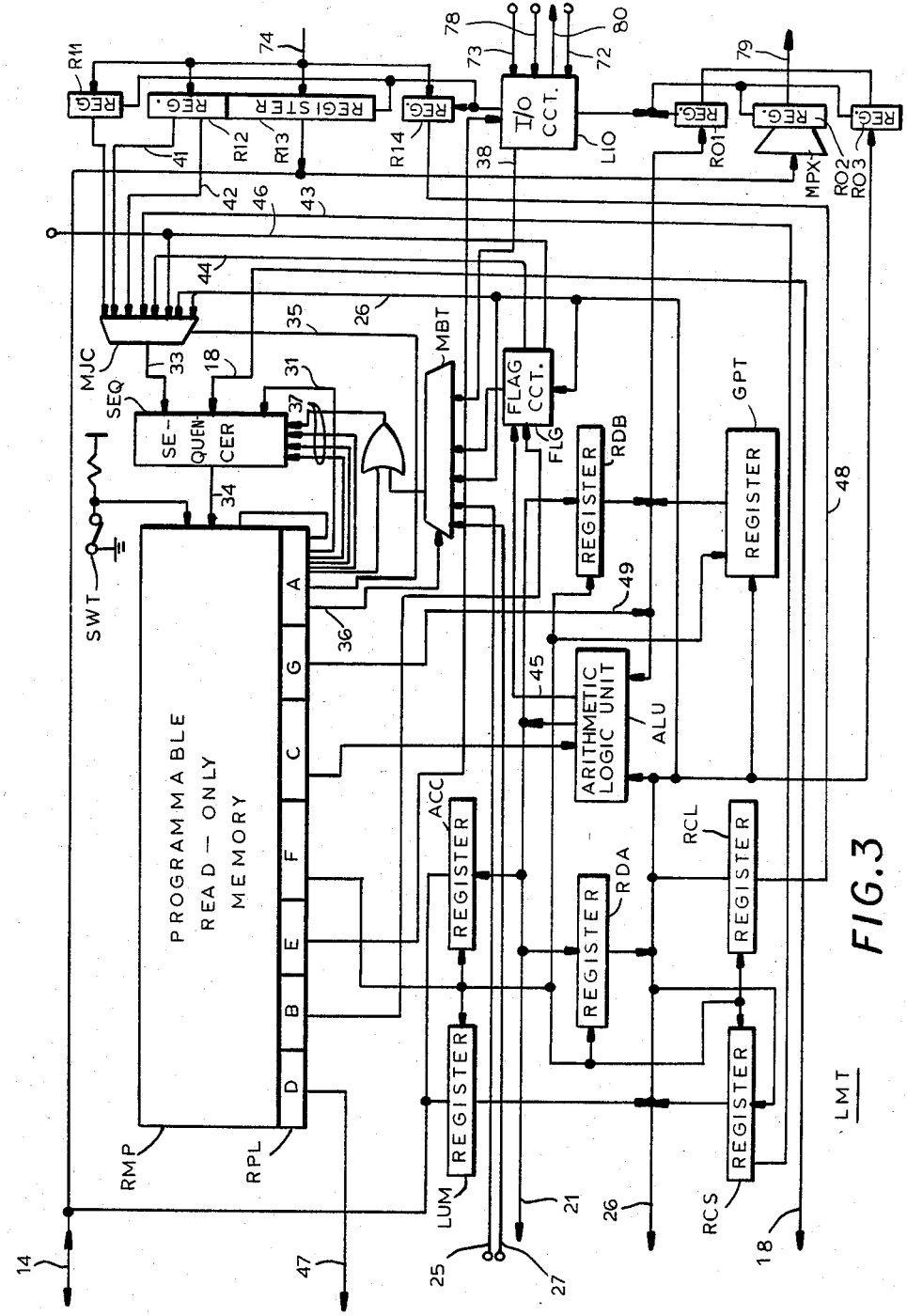

Block LMT, more fully illustrated in FIG. 3, is a microprogrammed logic unit for fast transfer between component DSC and line circuits and for data-flow control. It consists essentially of:

a PROM RMP with associated pipeline register RPL which contains the two microprograms for protocols X25, X75 and No. 7;

a sequencing logic comprising a sequencer SEQ, a multiplexer MBT for bits under test and a multiplexer MIC for the microprogram jumps and flags operating on cycles of 122 ns and locking onto time slots of 4 μs assigned to 32 PCM channels; and an arithmetic logic unit ALU with a series of working registers and, separated for speed reasons, a logic network for controlling the pointers of a free-sector table contained in the bi-port memory bank RAM of FIG. 2.

Figure 4:
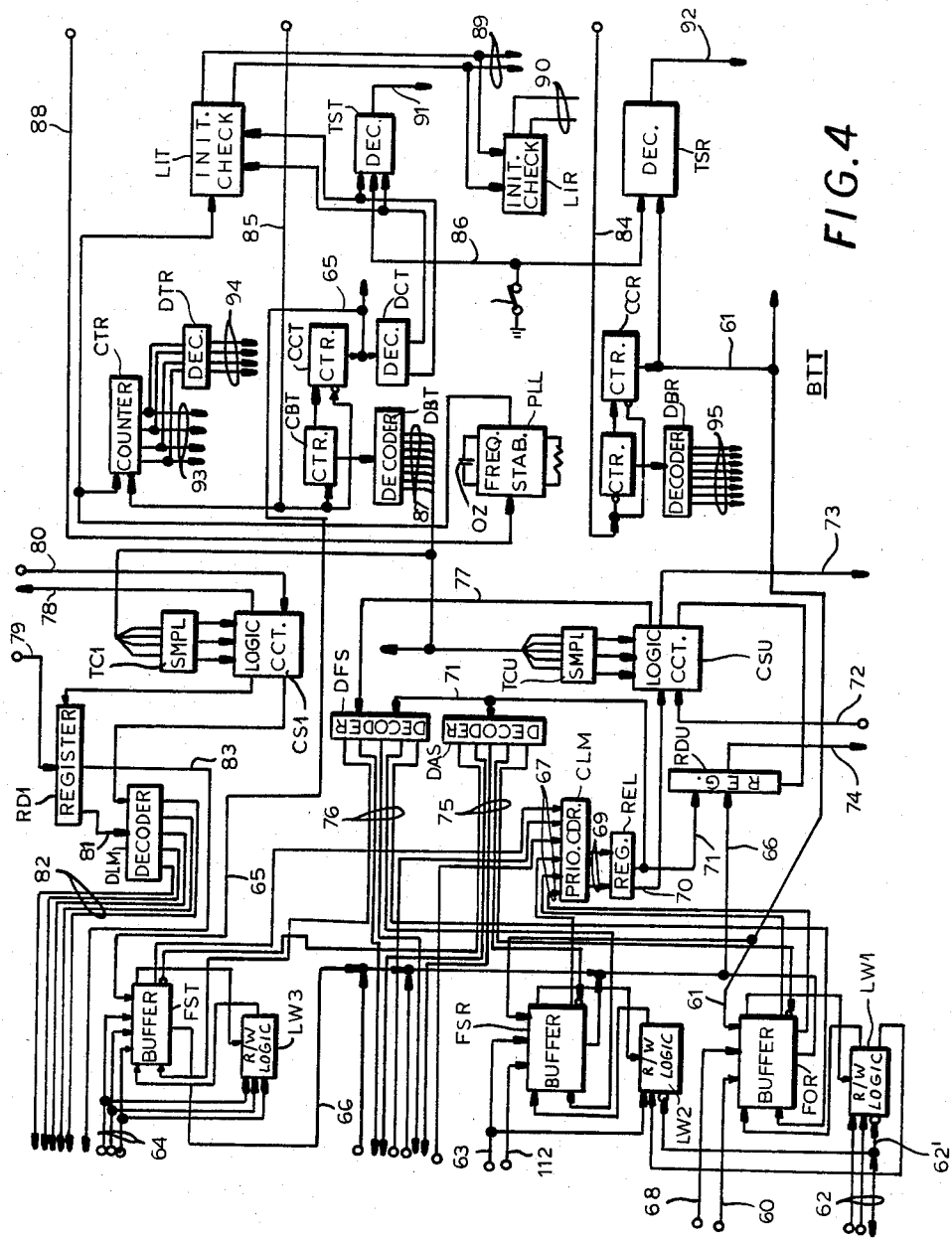

Block BTT, more fully shown in FIG. 4, contains buffers FST, FSR and another buffer FOR for the temporary storage of signalization and of data assembled into characters, respectively, for each channel arriving from the line circuits; these buffers are FIFO-organized and act as registers when transfer logic LMT is to execute long operations (normally at the beginning or at the end of messages).

The time base of the system, which uses an 8.192-MHz oscillator locked onto the 2.048-MHz clock of the PCM group, receives also the incoming and outgoing synchronism signals from a line 3 whenever they are available in the system to which the interface is connected, in particular in a digital switching network. Otherwise, clock and synchronism signals are locally detected and generated. Line 3 originates at PCM terminal TER.

Blocks LVI and LVO (see also FIGS. 3 and 6) are fast logic networks acting at the bit level which operate on the PCM flow entering on a wire 1 and generate the flow outgoing on a wire 2, respectively. They are each subdivided into three parts: an operative logic circuit, a "horizontal-shift" register for the PCM channel currently handled by the logic circuit, and a series of "vertical-shift" registers for the temporary storage of the status of the other channels of the group.

Output circuitry LVO has the following tasks:
Recognition of the "start of message" command;
flag generation;
request for octets or bytes to be transmitted;
insertion of stuffing zeroes;
check on a possible underrun;
recognition of end of message and of the length of any residual data word appearing as a truncated byte;
CRC computation and transmission;
recognition of a possible order of message termination without CRC;
recognition and execution of ABORT, IDLE, continuous FLAG commands;
communication, upon request, of the current state of an outgoing channel.

Input circuitry LVI has the following tasks:
Recognition of message start;
flag recognition;
assembling of the received bits into bytes;
cancellation of stuffing zeroes;
check on a possible overrun;
recognition of the end of message and of the length of any truncated byte;
CRC check;
recognition of a possible ABORT and of state changes;
inhibition and enablement, upon request, of reception of an incoming channel;
communication, upon request, of the current state of an incoming channel.

Block LVI also checks the received message format, which is to be at least four bytes long (protocols X25, X75). In case of use of protocol N. 7 it communicates the arrival of a byte even on those channels that are in a state of "flag search".

We shall now describe the operation of the interface when protocols X25 and X75 are used.

When an initialization command (referred to hereinafter as INIT) appears on bus 4, the interface inhibits the reception of all incoming channels and sets all outgoing channels in an idle state (transmission of continuous 1's). It then identifies in the bi-port memory bank RAM (FIG. 2) 256 sectors of 96 words each, constructs a table of their initial addresses (the aforementioned free-sector table) and sets a pointer thereof to the first free sector along with an indicator of table length. The interface next prepares six tables, of 32 registers each, whose tasks are: channel-sector association for input and output, setting current pointers to data sectors and counting the number of bits transmitted or received. At this point it accepts the commands sent by the processor, which may already have enabled the proper interrupts (the acceptance of this command is in fact automatic).

Then the processor, by a set of commands, enables the proper incoming channels and activates (by transmission of continuous flags) the proper outgoing channels (the latter operation may be unnecessary); thus the initialization phase ends.

When block LVI detects the arrival of a flag from an incoming channel, it begins to assemble the subsequent character: if this is again a flag, block LVI signals the passage of the channel from idle to active state. The first character different from a flag or the code ABORT, detected after a flag, is interpreted as a "first byte of message" which block LVI sends to logic unit LMT. This unit associates the channel with the first free sector of its table, prepares the byte-writing pointer, loads the byte starting from the second word of the sector and marks the arrival of 8 bits. Every time block LVI assembles a byte, it communicates this operation to unit LMT which, in turn, transfers it to the memory; it further updates the pointer setting and the number of bits received and verifies that this number does not exceed the maximum permissible length of the message. If this maximum is exceeded, logic unit LMT disengages the channel from the sector, discards the bytes subsequently received and sends to Register 0 a signal of "end of message with nonvalid frame"; the sector remains at the disposal of the processor until the latter requires its release. In a normal case, on the other hand, upon the arrival of the end-of-message flag, block LVI checks the accumulated CRC, notes the length of the last word (whenever the message is not a multiple of 8 bits) and reports all to the processor with the signal of "end of message".

With this information, block LMT computes the number of actual useful bits loaded in the sector, writes this number with the identity of the originating channel in the first word of the sector, disengages this sector from the channel, generates the "packet received" message with the sector number, and renders it available to the processor on Register 0. The sector, considered busy from its association with the channel, remains so up to its release by the processor; meanwhile it remains at the disposal of the processor which can use it also to demand the retransmission of the packet on another channel (by only changing the channel code in the first word) or for transmitting another message. If during reception an ABORT flag is detected, the corresponding signal is loaded into Register II, the received data are discarded and the sector is disengaged and considered free again; block LVI resumes the flag-search state. Upon the arrival of the first message byte, logic unit LMT might have no more free sectors available: in this case the message is discarded and the corresponding signalization for the processor is written in Register II. Of course, the whole message is discarded even if meanwhile the processor restores some sectors to the interface.

The cascaded components RFM, RFS, RCM and RRC may also be respectively referred to as message, interrupt, command and sector registers.

When the processor is to emit a frame, if same is not already present in the memory (e.g. when it has arrived from another channel of the group), it demands a free sector from the interface which responds by rendering available on Register VI the first address of the allotted sector after taking it off the table (should no further sectors be available, a corresponding signal would be presented on Register II). The processor loads the frame concerned into this sector and thereafter writes the number of bits and the destination channel into the first word.

The processor demands the transmission from a sector by a suitable message; the interface reads its first word, associates with it the indicated channel, transfers the number of bits into the position corresponding to the channel of the respective table, sets the reading pointer and sends the message-start command to block LVO through unit BTT. If block LVO is already emitting flags on the channel, it immediately requests the first byte to be transmitted; otherwise it generates a flag and requests the byte.

Afterwards, as long as the channel is in the state of transmission of a message, block LVO calls for bytes with an advance of about 125 $\mu s$ relative to their transmission. Upon each request, logic unit LMT transfers the byte, updates the pointer setting and decrements the number of bits to transmit; when the result of the latter operation is less than or equal to zero, immediately after the readout of a byte (or residual word), logic unit LMT gives to block LVO the signal of end of message accompanied, in case, by an indication of the length of the truncated byte.

Once this is done, block LVO concludes the message with the transmission of the computed CRC and of the flag. Unless there occurs a different instruction, it keeps then the channel in the state of "flag transmission". Whenever, during the readout, an underrun situation intervenes, block LVO concludes the message with an ABORT flag and switches to transmission of continuous flags.

The end-of-message signals, whether prompted by correct transmission or by an underrun, are communicated to the processor through Register 0; in any case the channel is disengaged from the sector and remains at the disposal of the processor. The ABORT flag, during message transmission, can be sent also on request of the processor; in this case the block LVO emits it and switches to continuous flags, thus not calling for any further bytes.

The processor, at any moment, can set an outgoing channel to the idle or the active state and can enable or inhibit an incoming channel. Every time the processor terminates the use of a sector, it restores that sector to the interface with a suitable disengagement instruction.

The processor must wait for the signal of "message transmitted" on a channel before ordering on the same channel a new transmission (unless it terminates the preceding one with an ABORT command). The processor further has the possibility of requesting the simultaneous transmission of the contents of a sector on several channels (if that should be useful) in the following way: after requesting the transmission from the sector, which carries the indication of the first of the channels, it changes this indication and requests the transmission again and so on. The acknowledgments of occurred transmission refer, however, to the sector and not to the channel so that in this case they are no longer unequivocal.

Let us now consider the operation of the interface in case protocol N. 7 is used. When command INIT arrives, besides inhibiting the incoming channels and continuously transmitting 1's on the outgoing channels, the interface carries out the initialization of the memory. In particular, it reads out 198 message sectors, each of 160 words, and constructs its table with the pointers as before.

The interface prepares for the outgoing channels a table of the channel-sector association, a table of the pointers, a table of the number of bits to be transmitted, and a table of the state words; for the incoming channels, it prepares an association table, a table of the pointers, a table of the number of bits received, a table of state words and a table of error counters.

Furthermore, for the filtering and transmission of stuffing and state messages which are repeated unchanged, it predisposes 32 sectors of four words strictly associated with the incoming channels and 64 sectors of four words strictly associated, two by two, with the outgoing channels.

All the tables relating to the channels always consist of 32 words, even though only 16 channels can be activated; this makes is possible to choose immediately any 16 channels whatever and to change them even during operation, without the necessity of re-initialization.

To start the procedure of initial alignment, the processor proceeds above all to enable the reception on the proper incoming channels. In this case the block LVI signals the reception of bytes on a channel even when it is in the flag-search phase.

After the initialization, logic LMT considers the channel in a state of suspended alignment procedure and does not act on it. This holds true even though the channel passes to continuous flag reception (which is communicated to the processor). By a suitable command the processor sets an appropriate error threshold on the channel (which will be always directly effected by the processor) and the error-check procedure remains deactivated until the beginning of the message flow. The logic unit will activate the procedure in the mode of "checking signalization unit" upon the arrival of the first message. When necessary, logic LMT changes over to the mode "byte counting", and vice versa.

When hlock LVI reports the reception of a first message byte, unit LMT determines whether a sector has already been associated with the channel and, if not, brings about such association. It then executes the transfer, updates the pointer setting and the number of bits received, and checks whether the first byte received is equal to the first byte contained in the four-word sector associated with the incoming channel (this sector, in fact, is to store the first bytes of each message to allow equal and repeated stuffing and state messages to be identified). In case of equality, the term "first unchanged byte received" is entered in the channel-state word; otherwise, the term "first byte of new message" is entered and the byte itself is loaded also into a stuffing/state sector.

Upon reception of the successive bytes, besides the aforedescribed operations, the logic unit updates the state word up to the fifth byte received, which may be unchanged or pertain to a new message. The two CRC bytes are also loaded, and then there are successively eliminated four stuffing-message bytes plus one CRC byte or the five state-message bytes; the first five bytes of two consecutive information messages are certainly different from each other; in so doing, the unit also carries out the check on permissible length. Finally it can detect a reception of seven or more consecutive "1" bits, sent by block LVI as an ABORT code, and an end-of-message code which in this case must not carry an indication of a truncated byte.

The operations which follow these events are equal to those carried out in conjunction with protocols X25 and X75, apart from the case of reception of a stuffing or state message equal to the preceding one, which is not communicated to the processor (the corresponding sector can still be reached by the subsequent message and thus remains associated with the channel); the reception of a number of bytes that is less than 5 (CRC included), or is not an integer, causes the emission of a "nonvalid frame" signal; furthermore, logic unit LMT steps the error counter and may generate on Register II the signal of "threshold exceeded".

As to transmission, the processor has, as before, the possibility of requesting above all the continuous transmission of 1's or of flags and may further request message transmission in the following way:

transmission of repeated stuffing or state messages: it thus requests a sector of "stuffing/channel state" and the logic unit assigns to it the first sector or the unused one of the pair, the processor loads it and then commands "transmitt stuffing/state on the indicated channel"; the logic unit has the information on which sector is involved and starts the continuous transmission, sending an acknowledgment signal to the processor only after the first time;

transmission of any single message: the processor requests a message area, if it does not have any at its disposal, requests the free stuffing area if it does not yet know its location, loads the message and the new stuffing or state code into the corresponding sectors and commands "transmission of a single message from the sector"; the interface executes the command, acknowledges it and automatically passes to the new stuffing/state message, sending the acknowledgment signal only during the first transmission;

transmission of a message inserted into a sequence: the transmission occurs as in case of protocols X25 and X75 with the passage to flag transmission at the end. If the processor emits a new transmit command within 125 μs after reception of an end-of-message signal, the two messages will be separated by a single flag.

Component DSC, as shown in FIG. 2, includes an assembly BDR of drivers and receivers through which all the signals between the interface and the processor transit via wires BBS7, BDAL(0 . . . 19), BSYNC, BDIN, BDOUT, BWTBT, BRPLY, BIAKI, BIAKO, BIRQ, all forming part of the bus 4 shown in FIG. 1.

Line BBS7 carries predecoded addresses for the peripheral registers already referred to. Leads BDAL(0 . . . 19) are bidirectional wires carrying at different times memory or peripheral-unit addresses and the data to be transferred on the bus.

Line BSYNC carries a sync signal whose leading edge indicates the presence of a valid address on wires BDAL and whose duration coincides with a bus cycle.

Line BDIN carries a reading request to the location addressed by the bus at the beginning of the sync signal while line BDOUT carries to that location a request for writing the data which have meanwhile replaced the addresses on wires BDAL.

Line BWTBT carries an indication whether the bus cycle in progress relates to a byte or to a word of other than eight bits.

Line BRPLY carries the acknowledgment signal that the interface has carried out the requested operation.

Lines BIAKI and BIAKO are two wires which enter into and exit from the interrupt "Daisy chain".

Line BIRQ is a wire through which the interrupt is requested.

Through connections BDAL, the bus receiver and a connection 5, the addresses emitted by the processor are transferred to circuits CM1 and CM2 which serve as address comparators. A lead 7, carrying the decoding signal of line BBS7, is connected to comparator CM1 which detects the access requests to Registers 0, II, IV and VI. Comparator CM2 detects access requests to the 32K memory bank RAM. When the sync signal appears on line BSYNC, address/data lines BDAL carry the valid address and the outputs of comparators CM1 and CM2 are also valid. Thus there is available the result of comparison between the address emitted by the processor and the address, preset by interruptors in units CM1 and CM2, of the memory bank RAM or of peripheral Registers 0, II, IV, VI represented by components RFM, RFS plus ABI, RCM and RRC as noted above.

Those signals coming from wires BDAL, present on line 5, which correspond to the positions of the address leads inside the memory bank are loaded into a register RAD in response to the leading edge of the sync signal arriving on a wire 8 from wire BSYNC through the corresponding bus receiver. These address signals remain stored for the appearance of a request directed to the local memory bank. The address bits possibly serving to determine which peripheral register or which byte or memory section the processor wishes to access, are carried by line 5 to access controller LGA and are stored there in a register together with the results of the comparisons carried out by units CM1 and CM2, present on a connection 9; such storage takes place on the leading edge of the sync signal carried by wire 8 and will be canceled on its trailing edge. If the comparisons are negative, logic circuit LGA has no more tasks to carry out. If one of the comparisons is positive, access controller LGA awaits an instruction from the processor regarding the operation required at that address which is to arrive over one of wires BDIN, BDOUT, BWTBT (reading, writing of a byte, writing of a different kind of word).

Controller LGA further receives on a wire 10, from a microprogram present in block LMT (FIG. 1), an inhibiting signal generated whenever that block is about to access the data stores RAM etc. of component DSC, the inhibition being lifted as soon as the access is terminated; this inhibiting signal is timed to avoid any incertitude and is sampled by controller LGA at the same time as the processor commands. If, upon the arrival of a command, an inhibition is in effect, that command remains in a waiting state; otherwise the access is guaranteed. If the processor requests access to a memory sector, controller LGA enables through a connection 11 the readout of register RAD on a line 12 addressing memory bank RAM. Then, in accordance with the command which has arrived and with the addressing bits which have been stored, the controller delivers via a connection 13 and a read/write logic LRW the appropriate enable signals to unit RAM. In case of a reading request, circuit LGA enables the memory sector involved to load the corresponding output signals into a register RDUA through a line 14; a connection 6 forwards these signals to the drivers in unit BDR, enabled via a wire 15, associated with wires BDAL. In case of writing, with wires BDAL carrying a data word to be written, controller LGA lets the data pass through a gating circuit TD1, enabled by the signal on connection 11, to the memory input and delivers the appropriate writing instructions through logic LRW. Then the controller sends back a response signal via wire BRPLY to the processor, which thereupon terminates the cycle.

Since the other sources connected to the internal buses involved are directly enabled by the microprogram which also generates the inhibiting signal, no command overlap can occur.

As concerns requests for access to registers RFM, RFS, RCM and RRC, logic circuit LGA has the information as to which register is to be dealt with; as noted earlier, these registers are seen by the processor merely as read-only or write-only locations. Circuit LGA, similarly to what has been described, directly acts on the enabling inputs of registers RFM, RFS+ABI, RRC and on the clock of register RCM through a connection 16.

Internal data bus 14 is connected to a parity generator CGP, which is cut off, upon a command arriving through connection 11 from circuit LGA, when the processor accesses the memory bank RAM. This is so because the processor generates the parity during writing, while the memory already contains the parity bits, generated by unit CGP, on being written by the control logic of component LMT.

Logic LGA consists of a programmed read-only memory (PROM) with a double input register (connected in cascade for some bits) and an output register. The second input register and the output register are loaded in the rhythm of a sampling or microcycle clock. The first register serves on the contrary to load the significant variables on the leading edge of the sync signal coming from the processor.

For a reading of FIFO memory RFM considered by the processor as Register 0, logic circuit LGA enables its outputs by way of internal data bus 14; circuit CGP calculates the parities and all of it is loaded into register RDUA. Thereupon logic LGA supplies register RFM with the reading clock on connection 16, preparing for the possible reading of a subsequent data word during another cycle requested by the processor.

The same thing happens with assembly RFS+ABI, with the difference that its part ABI is an ordinary register in which there are stored the enable signals to generate interrupts and which consequently is not unloaded during reading; its outputs are connected upstream of the junction with bus 14 through a line 17 to the logic circuit LIRA generating the interrupt commands.

The writing in register ABI is carried out upon a processor command through register RCM and a transfer circuit TRA. This logic circuit decodes the processor command appearing on a bus 18; when it coincides with the update instruction for the enable signals, their transfer is effected from bus 14 to register ABI through circuit TRA.

When logic LGA decodes a request for writing in register RCM, it enables gate TD1 for transferring the word to be written to the input of that register through bus 14 and thereupon delivers the clock to register RCM through connection 16. Every time the register is loaded, a flip-flop FLGA with an output connected to register RRC is reset. This output goes high any time the register RCM is read; during the initialization, the setting of flip-flop FLGA means that the register is free.

The reading of register RRC by the processor takes place in the usual manner.

Circuit LIRA, generating a vectorized interrupt signal, receives from the wires of connection 17 data-ready signals for the read-only registers RFM, RFS, RRC and a "register free" signal for the write-only register RCM (as seen by the processor). It also receives the corresponding enable signals and the information of availability of bus 4, the latter coming from logic LGA through a connection 19; when one of the "data ready" or "register free" signals is true with the corresponding enabling instruction, the circuit generates the interrupt request on a connection 20 from which it passes on wire BIRQ to the processor. Upon a response of the processor on wire BIAKI, circuit LIRA checks the timing and emits on bus 14 the vector of the interrupt, which is loaded by logic LGA into register RDUA.

The access to the memory and to the registers by the other blocks of the interface is more immediate, being directly controlled by the microprogram.

To access the memory bank RAM, the interface transmits on wire 10 an inhibiting signal to logic LGA, loads the address into a register LAD through a bus 21 and enables the readout of that register by a suitable signal on a wire 22. For reading, it delivers the appropriate command to logic LRW through a connection 23 and extracts the data word on the internal bus 14; for writing, it sends the data word on this bus and supplies an appropriate command through logic LRW.

The writing in FIFO register RFM is immediate by sending the data word through bus 14 and the writing clock through a wire 24; a signal "full" is sent back by that register on a wire 25.

FIFO register RFS extracts data partly from the internal bus 14 and partly from a separate "channel" bus 26. Its writing occurs in a manner analogous to that described above, with generation of a writing command on a wire 28; in this case, too, a "register full" is sent back on a wire 27.

Also immediate are the writing in register RRC, upon command arriving via a wire 29, and the reading of register RCM, enabled by a signal over a wire 30. The only peculiarity is that four bits of register RCM, which form the command code coming from the processor, do not go out on the internal data bus 14 but are directly sent to an input of the sequencer SEQ (FIG. 3) of the microprogram through bus 18.

Block LMT, represented in FIG. 3, is the microprogrammed logic circuitry for transferring and controlling the data flow, whose tasks are established by the microprogram stored in its programmable read-only memory RMP. This memory is dimensioned to contain two different microprograms, specifically for establishing either the 32-channel protocol X25, X75 or the 16-channel protocol No. 7.

Memory RMP is organized into four pages of 256 words each; two of them contain the first microprogram and the other two the second, a changeover from one to the other being accomplished through a manual switch SWT. The microprogram page containing the subsequent instruction is established by the microinstruction itself in a non-conditioned way.

Within each page the memory is addressable by the sequencer SEQ associated with multiplexer MBT and MJC. Sequencer SEQ can choose the subsequent address from among four different sources: the microprogram counter, the microprogram stack (both inside SEQ), a direct input on a bus 31, and a register with separate input on bus 18. A further input 33 is directly connected, in an OR circuit, to sequencer outputs 34 carrying the RMP addresses. Four of the eight wires of this input are connected to multiplexer MJC which selects one out of eight 4-bit paths. When this multiplexer is enabled by the microprogram through a bus 35, selecting the input to be extended to sequencer SEQ as a source of the address to be emitted in a suitable code delivered by the microprogram on a wire 31, there are available eight sources of multipath jump (4, 8, 16 paths). Multiplexer MBT with 16 1-bit paths, when enabled by the microprogram through a bus 36, determines the choice of the source of the subsequent address in dependence upon the value of the bit controlling the selection (bit under test). Circuits MJC, SEQ and MBT are controlled by the microprogram through connections 31, 35 and 36 and a further connection 37. These carry the signals selecting the address source and instructions for the microprogram stack inside sequencer SEQ.

The microprogram word is written in the pipeline register RPL at each microcycle clock; the fields this word is composed of are the following:
(A) sequencing field;
(B) flag-control field;
(C) control field for unit ALU;
(D) control field for reading and writing in block DSC;
(E) control field for the information exchange with block BTT;
(F) Control field for internal registers LUM, ACC, RDA, RDB, RCS, RCL and GPT.

The bits which are fed to multiplexer MBT and which may be microprogram-controlled are the following:

two bits coming from an input/output circuit LIO, communicating with block BTT (FIGS. 1 and 4), through a connection 38; this logic circuit LIO, in turn, receives clock signals from the time base contained in block BTT; the bits referred to supply the microprogram with two time signals enabling it to lock onto the operating cycle of the logic which controls the PCM group;

a data-ready bit coming from logic LIO, also on connection 38, which indicates that new information has been written in registers RI1, RI2, RI3 and RI4; these registers, like other registers R01, R02 and R03, more properly are part of block BTT but for clarity's sake have been represented as components of block LMT in FIG. 3;

a bit on the state of registers R01, R02, R03, likewise coming from logic LIO through connection 38;

a bit on the state of FIFO register RFM ("register full") coming from block DSC (FIG. 2) on wire 25;

a similar bit on the state of FIFO register RFS, coming from block DSC via wire 27;

a bit from the internal bus 26, to be discussed hereinafter;

two flag bits preset by the microprogram;

three bits loaded into flag flip-flops, present in a circuit FLG, which indicate the states of arithmetic unit ALU, specifically the carry out of the eight least-significant bits of the calculation result, the same relating to the entire 16-bit word, and an operand equality; and two bits of two flag flip-flops, present in circuit FLG, which are microprogram-controlled and can be loaded with the two least-significant bits from the internal bus 26. They arrive from cells allocated in memory bank RAM (FIG. 2) through bus 14, register LUM and bus 26 and thereby allow the test of flags stored in registers of that memory.

Multiplexer MJC is supplied with codes on which the microprogram can effect multi-path jumps; they are:

a code of three bits characterizing the instant signal and coming from register RI1 which is connected with block BTT through a line 74; this code can assume the following meanings: first byte of received message, byte following the first, event relating to transmission, event relating to reception, transmission state, reception state; one of the bits at an input of this multiplexer is maintained at zero level (ground) and the jump consists of 8 paths, two of which are nonsignificant;

a 3-bit code, coming from register RI2 on a connection 41, whose meaning depends on the preceding code; if the latter specifies a transmission event, the bit combination on line 41 can assume these significant values corresponding respectively to a request for a byte to be transmitted, termination of transmission and underrun on the transmission; if, on the other hand, the event pertains to reception, the code on line 41 signifies the number of valid bits in the byte last received;

a 4-bit code, coming from other points of the same register RI2 on a connection 42, which represents the event code in reception with the following meanings: regular end of message, end of message with nonvalid frame, end of message with error of CRC, overrun, passage to idle state, passage to flag, and ABORT reception; two paths are provided which allow the jump to 4-bit codes contained in the channel registers of memory bank RAM and therefore can be respectively connected to the two 4-bit groups of the less-significant byte of the internal bus 26 at the output of register LUM;

a 3-bit code, coming through a connection 43 from register RCS, which contains the number of residual bits of the last byte of the messages to be transmitted; this number, computed by unit ALU, is transferred to register RCS through bus 21, register RDA and bus 26;

a 3-bit code, arriving through a connection 44 from circuit FLG, which comprises a flag contained in the registers of memory bank RAM (FIG. 2) and transferred to this register through bus 26, register LUM and bus 14, a flag written with the carry-out value of the operation effected on the low byte by unit ALU, present on a connection 45, and a flag written with the value of the comparison between the two operands of unit ALU, also present on connection 45; and a 3-bit code, coming through a connection 46 from circuit FLG (2 bits) and from block BTT (1 bit); the two bits coming from circuit FLG are microprogram flags whereas the bit coming from block BTT represents the position of a manually operated switch COM (FIG. 4) which enables or inhibits the processing of channels Nos. 0 and 16 of the PCM group differently from the others in order to allow the normal use provided for standard PCM groups (synchronism and signaling).

The input to an internal register of sequencing circuit SEQ is directly connected through line 18 to the instruction bits of the command register RCM present in block DSC (FIG. 2). The sequencer register is loaded at every microcycle and consequently always contains updated information; whenever the processor command is taken into consideration, the microprogram clears register RCM with a command on a connection 47 and wire 30.

Unit ALU, which carries out the usual logic and arithmetic operations, has the two inputs for its two operands connected to buses 26 and 49. The first input, connected to bus 26, can receive as an operand the contents of register LUM, which in turn is loaded by bus 14 with the contents of cells of memory bank RAM, with the contents of command register RCM, or else with a byte from block BTT, paired with each of the two bytes of bus 14 by register RI3. This input can also receive the contents of register RDA, which can be loaded in turn with the output of unit ALU through bus 21, and the contents of registers RCS and RCL; register RCS stacks the information present on this internal bus, whereas register RCL receives from register RI4 via a line 48 the identity of the channel to which the information arriving from BTT pertains. The most-significant bit of the channel code supplied to register RCL on bus 26 is the test bit fed to multiplexer MBT through which the microprogram can discriminate between channel No. 0 and channel No. 16 for the above-mentioned different-mode operation.

The second input of unit ALU can receive its operand either through bus 49 from register RDB (result of a previous operation) or from the 16-bit field G, containing a constant supplied by the microprogram. Another source is the register GTP which allows the high byte of the operand on bus 26 to be transferred to the low byte of the operand on bus 49.

The signals emitted on the output of unit ALU tied to bus 21 can be written into register ACC and made available to the internal data bus 14 (thus also to the memory bank and the registers of block DSC of FIG. 2), into register RDA or RDB (for return to unit ALU as an operand) or into the address store of register LAD in block DSC.

Logic circuit LIO performs the input and output control from and to block BTT. Locked onto the operating cycle of block BTT, it serves to transfer the data from the output registers of that block to input registers RI1 . . . RI4 whenever they are free. The presence of a data word is signaled to circuit LIO on a lead 73. An acknowledgment signal is sent back on a connection 72. The transfer from output registers R01, R02, R03 to the input registers of block BTT is similarly effected.

Registers RI1 . . . RI4 receive from block BTT 16 signals by way of a connection 74. Three of these, written in register RI1, are the command characterization already discussed; five of them, written in register RI4, are the channel code and the remaining eight are either the corollary information or the received byte. These last eight bits are written into register RI2 and duplicated in register RI3. The content of register RI2 is used for the jumps, as already described, whereas the content of register RI3 is used to transfer the data bytes through the 16-wire bus 14.

Registers R01 . . . R03 have opposite functions. The code characterizing the outgoing signalization, present on internal bus 49, is written in register R01 which consists of three cells. Register R03, composed of five cells, carries the channel code extracted from the outputs of register RCS, RCL or RDA through bus 26. Register R02, consisting of eight cells, is preceded by a multiplexer MPX and receives through bus 14 the high or the low byte of the data word read out from memory bank RAM or generated in output register ACC of unit ALU. The command of this multiplexer depends on the least-significant bit of the memory address (the commands generated by unit ALU are always supplied on the low byte). The data are delivered to block BTT on a bus 79 while wires 78 and 80 exchange the signals of data received and data ready, respectively.

Blocks LVO and LVI (FIG. 1) can generate two messages for block LMT during each PCM time slot and, in the opposite direction, can accept two messages from block LMT. During routine operation, i.e. when the phases of beginning and end of a message are not in progress and the channels are busy, the operations to be carried out in each time slot are generally the following ones: logic LVI communicates a received byte, logic LVO requests a byte to be transmitted, and logic LMT forwards the requested byte.

These operations are carried out by block LMT within the time slot and hence do not generate message queues.

At the beginning and at the end of a message, however, block LMT cannot always carry out all the operations in time and, in such a case, accepts only one message; at the end of a message being transmitted, it generates then two items of information for the line logic (last byte and an end-of-message signal). This creates the possibility of a temporary signal accumulation which is to be dissipated during the transmission of flags and CRC bytes, in channel time slots in which bytes remain incomplete on account of stuffing, during free channel time slots and, finally, during the reception of flags and CRC.

Block BTT (FIG. 4) is provided, for this purpose, with the several FIFO buffers FOR, FSR and FST already referred to. The first buffer FOR, which is associated with a conventional reading and writing logic LW1, receives an incoming byte from block LVI on a connection 60 and the identity of the respective channel on a connection 61 from the local time base; logic circuit LW1 exchanges the usual writing signals with block LVI through the wires of a connection 62.

The second buffer FSR receives from block LVI through a connection 63 the messages relating to channel states or events; writing in this buffer is controlled by a logic LW2 which receives the corresponding commands from block LVI, also via connection 62. The third buffer FST receives from block LVO on a connection 64 the state of the outgoing channels; line 64 carries also the writing commands to a control logic LW3. Buffer FST further receives the transmitting-channel code on a connection 65, again from the time base of block BTT. The outputs of these three buffers converge into a bus 66 which is also connected directly to blocks LVI and LVO for the reception of those signals that do not need temporary storage.

The presence on bus 66 of a message to be communicated to block LMT is signaled through the wires of a connection 67 to a priority coder CLM. In particular, a signal coming from block LVI through a connection 68, buffer FOR and an associated wire of connection 67 informs the coder that the received byte is the first of a message.

Circuit CLM chooses which message to forward to logic LMT and loads the corresponding source code, together with the request bit, into a register REL through a connection 69. A message-transmission request is sent by that register to a logic circuit CSU, controlling the exchange with block LMT, on a wire 70. Logic CSU verifies through wire 72 whether block LMT is ready to accept the message. If block LMT is available, logic CSU writes in a register RDU the message present on bus 66 and an associated source code present on a bus 71 for forwarding to that block on bus 74, sending a transfer command on wire 73. To carry out in register RDU the writing of the message selected by coder CLM, the source code present on bus 71 is also sent to a circuit DAS which decodes the enable signals of the sources of the message on bus 66 (i.e. buffers FOR, FSL, FST and the direct connections to blocks LVI and LVO). On a connection 75 the decoder DAS enables the selected message source. The same source code is used also by a decoder DFS to communicate to the source on a connection 76 a signal of occurred exchange, which causes the cancellation of the message. This signal is communicated by logic CSU to decoder DFS through a wire 77.

The execution of the data transfer from block LMT to block BTT is similar to the preceding case but requires no temporary storage as the data are treated in real time. An exchange-control circuit CSI for the incoming data enables in appropriate time phases, through wire 78, block LMT to supply the message. Block LMT transfers this message to bus 79 and through wire 80 reports its presence to logic CSI which writes the message, including its destination code, into a register RDI. The latter sends this code through a connection 81 to a decoder DLM which in turn, through the wires of a connection 82, transfers the message stored in register RDI to its destination, e.g. in block LVI or LVO. The message data are sent to that destination on a bus 83.

The time base referred to above, present in block BTT, includes a voltage-controlled oscillator OZ working into a frequency-stabilized and phase-locked loop PLL. The oscillator generates the basic interface frequency of 8.192 MHz, equal to four times the PCM frequency of 2.048 MHz, present on a wire 88. Through a 4:1 divider contained in circuit PLL, the basic frequency is slaved to the PCM frequency in order to ensure four cycles per time slot.

The incoming channel codes are reconstructed by means of counters CBR and CCR synchronized via a lead 84 by the incoming PCM alignment signal, present on connection 3 (FIG. 1). The outgoing channel codes can be similarly reconstructed, by means of counters CBT and CCT synchronized via a lead 85 by outgoing PCM alignment signals but only when the alignment signal is generated outside the interface and is also available on connection 3.

The four phases are generated in each PCM time slot through a counter CTP and a decoder DTP; the time slots Nos. 0 and 16 are decoded at the input by a circuit TSR and at the output by circuits DCT and TST. A wire 86, connected to the manual switch COM, may or may not enable these decoders according to whether channels Nos. 0 and 16 are to be used in the transparent mode or are being processed, as already noted. Decoder TST sends a transparency signal to block LVO on a wire 91; decoder TSR emits the same signal to block LVI on a wire 92.

Moreover, pulses having a duration equal to that of PCM bits are generated by respectively decoding the output signals of counter CBT with the aid of a circuit DBT and those of counter CBR with the aid of a decoder DBR. The output signals of decoder DBT are sent through a connection 87 to circuits TCI and TCU generating the sampling phases of messages interchanged with block LMT.

Finally, circuits LIT and LIR carry out the initialization check respectively of blocks LVO and LVI, via signals sent on connections 89 and 90, by identifying the first PCM frame following the interface activation.

The signals present on connections 87, 93, 94 and 95 are the time-base pulses which are distributed to all the interface circuits.

An incoming serial PCM group arriving at block LVI (FIG. 5) on wire 1, is transferred to a bit-sampling and synchronizing circuit SFE and is then sent through a wire 101 into two different directions: on the one hand to a PROM-type memory PPR of an operational logic network LWJ and on the other hand to a shift register SOO which assembles the message byte.

A "vertical" shift-register assembly SVS emits at the beginning of each time slot the bit combination which was present on the same channel after the last bit of the preceding frame. Assembly SVS consists of n 32-cell shift registers connected in parallel to allow the concurrent shifting of an n-bit word representing the state of the channel state word. That state word is sent to the operational logic network LWJ which is basically a synchronous finite-state device whose input signals can arrive from assembly SVS through a bus 102 or from its own outputs through a bus 103. The choice between the two input signals is effected by a multiplexer MIS, controlled by a signal present on a wire 104 coming from a logic circuit CV1 which enables the writing or reading of assembly SVS. The input connections of memory PPR include, besides the aforementioned wire 101, a line 105 from multiplexer MIS which carries the channel state word and a line 106 which carries the number of already received bits of logic level "1".

The outputs of memory PPR include a connection 107, by which the updated number of consecutive bits of logic level "1" is sent to a register RPS, and a connection 108 feeding the new state of the channel to a logic circuit LTC included in network LWJ. This logic circuit further receives from multiplexer MIS, over a connection 109, a code which indicates the number of valid bytes of a message already received in the channel being processed, and over a connection 110 a code which indicates the number of valid bits already received in the present byte.

Normally, logic circuit LTC presents at its outputs the same state as at its inputs. Only during processing of channels Nos. 0 and 16, and only if the transparency of such channels is requested, does it arrange its outputs so as to avoid protocol execution. This is done by using the commands arriving on wires 92 and 95 also shown in FIG. 4.

The updated state code issues from logic circuit LTC on a bus 116 and is transferred to register RPS.

A circuit SBV increments the code of valid bits that arrives from logic LTC on a connection 111. The result is sent to register RPS on a connection 112. Similarly, a circuit SOV increments the code of the valid bytes that arrives from logic LTC on a connection 113. The result is sent to register RPS on a connection 114.

Logic circuit LTC sends through a wire 115 a signal of valid bit, to be assembled into a byte, to another logic circuit XCR.

A new state word is written into the register RPS at the end of each bit period; if the next bit period still belongs to the same channel, the content of this register is fed back to the operational logic network LWJ through connection 103 and multiplexer MIS. If, on the contrary, the subsequent bit period pertains to the next channel, the content of register RPS is transmitted via connection 103 to the input of register assembly SVS and logic network LWJ receives, by way of connection 102, the state of the new channel.

In each bit period a decoder DUP receives several output signals of logic LTC, namely one on a bus 116 representing the updated state, another on a wire 117 informing it that seven consecutive bits of logic level "1" have been detected, and a third on a wire 118 with the meaning of "starting flag detected" or of "end of message" (see protocols X25/X75, CCITT N. 7 and the like). Decoder DUP further receives the code of number of valid bytes which is present on bus 114, a signal of completed byte coming from incrementer SBV via a wire 119, and a signal of valid frame (in conformity with the aforementioned protocols) coming from incrementer SOV via a wire 120.

Decoder DUP then detects the significant events on the channel. They are:

reception of the first byte of a message, signaled on line 68;

end of message, signaled on a wire 122;

passage from "idle" state to "flag reception", signaled on a wire 123;

passage to "idle" state, signaled on a wire 124;

reception of an "ABORT" flag, signaled on a wire 125;

reception of complete message bytes subsequent to the first one, signaled on a wire 126.

A logic circuit LOE, when activated by a manual switch CN7, checks the state code present on bus 116 and, when this state is "idle", signals on a wire 127 the presence of a byte which does not belong to a message. This is necessary during the phases in which bytes are counted, according to the diagnostics of protocol CCITT No. 7.

Wires 120, 122, 123, 124, 125 extend to a coder CPR along with a lead 62' which comes from block BTT of FIG. 4 and carries a signal of unavailability of buffer FOR to receive new bytes; leads 62', 126, 127 are part of the connections 62 already described. Another wire 121, coming from a circuit CMP for the checking of message redundancies (which will be described hereinafter, also terminates at coder CPR which emits on bus 63 the information to be transferred to buffer FSR. The code issuing from incrementer SBV on bus 112 is also forwarded to the latter buffer.

Wires 126 and 127, forming part of bus 62, signal the presence of bytes to be loaded to logic LW1 (FIG. 4) controlling the writing in buffer FOR. If the byte is the first one of the message, a suitable signal is supplied to this buffer on wire 68. The byte to be loaded is in turn present on bus 60, coming from character-assembling circuits represented by the aforementioned register SOO, other registers SVO, SVC, EXO, SOC and multiplexers MPP, MPX, MPZ. These circuits serve to reconstruct bit by bit the message bytes (circuits SVO, MPX, SOO) and the corresponding redundancy character (circuits SVC, MPP, EXO, MPZ, SOC). Besides components PPR and LTC, circuits SBV, SOV, DUP and EXO are part of network LWJ.

Circuit SVO consists of eight 32-cell shift registers connected in parallel and allows the storage of the last eight valid bits received on the channels. The bits received in an active channel state are considered valid, provided they are not 0's following five consecutive bits of level "1".

Circuit SVC is a shift-register assembly analogous to circuit SVO but for 16-bit words and contains, as will be seen hereinafter, the partial result of the check on correctness of the transmitted message with CRC redundancy. This partial result pertains to the bits received before the eight bits stored in circuit SVO.

At the beginning of each time slot the logic levels of the bits already received are transferred from the output of circuit SVO to one of the inputs of register SOO through a bus 128 and multiplexer MPY. The partial result of the correctness check is sent from the output of circuit SVC to an input of multiplexer MPP through a bus 129.

At that instant, logic XCR positions by signals on wires 130 and 131 the input multiplexer MPY of circuit SOO on the path coming from bus 128, the multiplexer MPP on the path coming from bus 129 (whence the word coming from circuit SVC transits on a bus 132) and the input multiplexer MPZ of circuit SOC on the path coming from bus 132. Then logic circuit XCR emits the writing command into the registers contained in circuits SOO and SOC which thus contain the information on the channel that is about to be received.

Another set of inputs of multiplexer MPY is tied to bus 60 which receives the output signals of shift register SOO. The wires of bus 60 are connectable by this multiplexer to stages of register SOO offset by one shift position with respect to the corresponding output connections. The rewriting of the extracted bits through this feedback loop thus entails a shift to the right by one position. A further input of multiplexer MPY is connected to wire 101 which carries the new bit coming from the PCM data flow. When wire 115 carries the information that the bit present on wire 101 is valid, logic circuit XCR commands through wires 130 and 133 a rewriting operation in register SOO through the described feedback loop.

This operation, accordingly, involves a one-position shift for the eight previous bits and the writing of one new bit. The bit lost by register SOO is transferred to circuit EXO on a wire 134.

The rewriting procedure with shift in register SOC (through a bus 135) is analogous to that described for shift register SOO, with the difference that the output signals of register SOC are fed back through circuit EXO before arriving at a set of inputs of multiplexer MPZ on a bus 136. Circuit EXO implements the algorithm for computing the redundancies, according to the procedures of the cited protocols.

After the described operations have been effected on the last bit of a channel, the contents of shift registers SOO and SOC are respectively retransferred to the inputs of circuits SVO and SVC through buses 60 and 135.

The shift in circuits SVO and SVC is controlled by a logic circuit CV2 through wires 137 and 138.

When the start of a message is signaled to logic circuit XCR via wire 68, this circuit, through commands on wires 130, 131 and 133 causes the loading of register SOC with the initialization word for the redundancy computation which is permanently supplied to an alternate input of multiplexer MPP by a line 139.

When decoder DUP emits on wire 126 to block BTT (FIG. 4) the signal of "byte ready", such byte is available on bus 60 from the output of register SOO.

Circuit CMP compares the CRC word present at the output of register SOC on bus 135 with a predetermined code permanently present on a line 140. The comparison result is forwarded to coder CPR via wire 121 and, if affirmative at the end of the message, establishes the correct reception of that message.

Also included in block LVI is a random-access memory MAC containing 32 bits, associated with respective channels, representing enabling or inhibiting of instructions for that channel. The random writing is controlled by block BTT (FIG. 4) through a wire 82', forming part of connection 82, while the addresses and the data are present on connection 83. Memory MAC is cyclically read at the address of the incoming channel arriving from block BTT on bus 61.

A register LIM temporarily stores the writing address and the data word to be written and forwards them to a multiplexer MIM on a connection 141. A logic circuit SLM controlling writing and reading in memory MAC selects the access-time phases, so as to command reading in the position of the current channel at its beginning and to store the contents of the corresponding cell in a register RAB for the entire time slot. A writing command is given whenever a corresponding instructions appears on wire 82', at the end of the reading operation, A possible inhibiting instruction, written in register RAB does not affect the logic network LWJ but is sent to block BTT through connection 62' to inhibit the forwarding to block LMT of any information relating to the current channel.

A register RIR receives from block BTT on connection 83 the code of a PCM channel whose state may have been requested by block LMT. When this register is being loaded, its output signals are compared by a circuit CCC with the current channel whose identity is supplied by the local time base. When comparator CCC detects a coincidence, the state present at the output of shift register SVS is forwarded to block BTT through a register RLR and the bus 66; if the message can be accepted by block LMT, registers RIR and RLR are reset; otherwise the message is maintained in register RLR and retransmitted in the subsequent frame.

The commands for registers RLR and RIR arrive on connections 75, 82 and 76.

Figure 6:
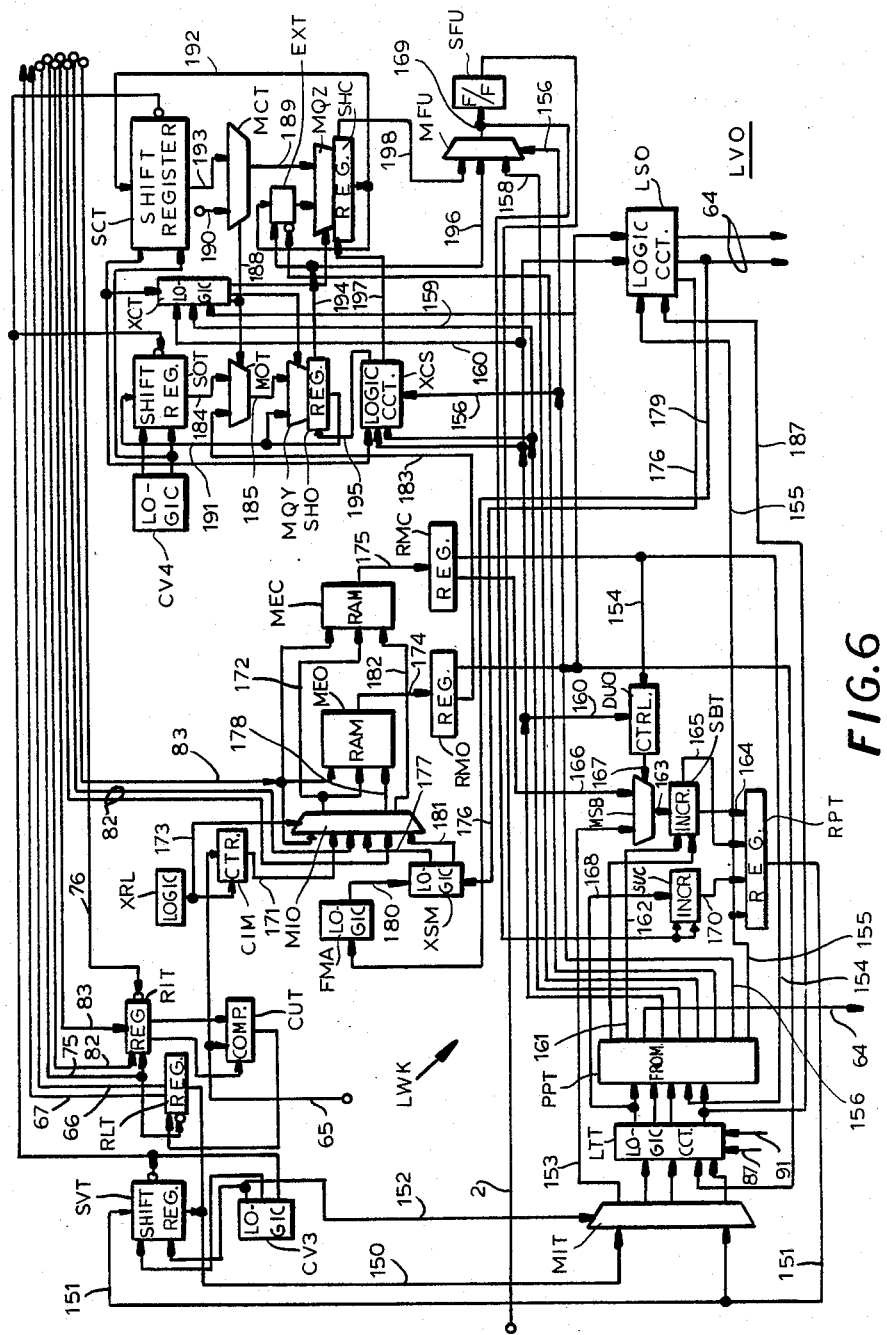

Block LVO, shown in FIG. 6, generates the outgoing PCM group locked to the channel cycles generated by the time base present in block BTT.

Figure 5:
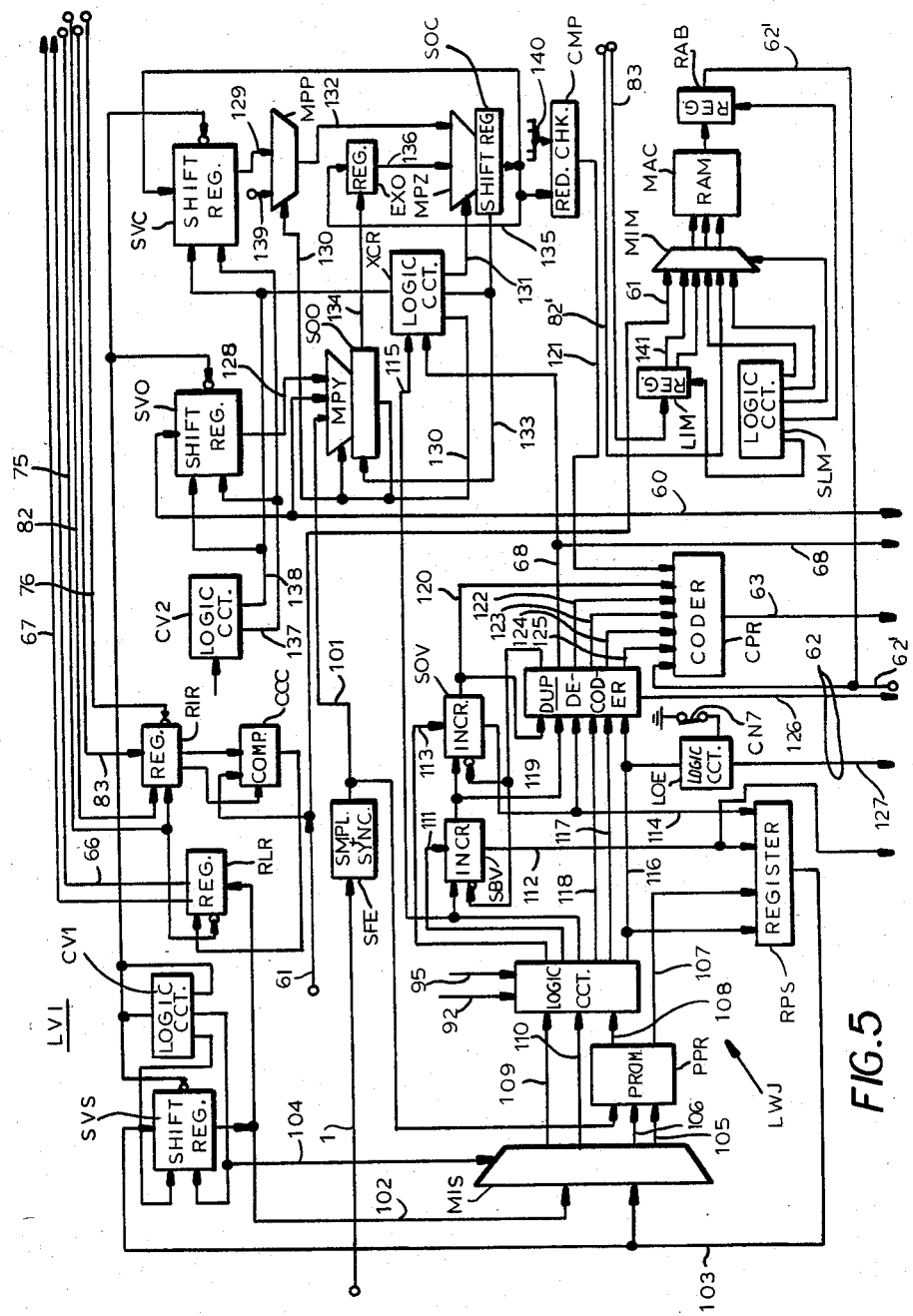

A "vertical" shift-register assembly SVT has a structure identical with that of circuit SVS, FIG. 5, and like the latter emits at the beginning of each time slot the bit combination which was present on the same channel after the last bit of the preceding frame. This bit combination is again a state word that is transferred to an operational logic network LWK, similar to network LWJ of FIG. 5, whose input signals may arrive from assembly SVT through a bus 150 or from its own outputs through a bus 151. The choice between the two input signals is effected by a multiplexer MIT, controlled by a signal present on a wire 152 and emitted by a logic circuit CV3 which enables the reading or writing of assembly SVT.

The output signals of multiplexer MIT, with the exception of those present on a connection 153, go to a logic circuit LTT of network LWK which normally presents again on its outputs the same state as at its inputs. Only during processing of channels Nos. 0 and 16, and only if the transparency of such channels is requested, does it set its outputs so as to avoid again the execution of the protocol. This is done by using the commands on wires 87 and 91 coming from block BTT.

Another PROM-type memory PTT for executing the protocol receives, besides the signals from logic circuit LTT representing the channel state, also the command code of the operations to perform on the outgoing channel. This command code comes from a register RMC over a wire 154.

Memory PTT emits:
the updated channel-state code on a connection 155;
signals commanding bit by bit the transmission on the outgoing PCM path 2, made available on connections 156, 157, 158;
signals commanding the acquisition of the bytes to be transmitted, on wires 159 and 160;
the signal of end of transmission of the message which is forwarded to block BTT, on connection 64;
signals commanding the counting of the valid bits transmitted on wires 161 and 162.

The counting of valid bits is carried out by an incrementer SBT which receives the code to be incremented on a connection 163, originating at a multiplexer MSB, and supplies the result on a connection 164 to a register RPT. It further supplies the end-of-transmission signal of a complete byte to the same register on a wire 165.

As the protocol lets the last byte of the message consist of a number of significant bits lower than eight, the input line 163 of incrementer SBT is connected to multiplexer MSB which normally presents the partial result of the count coming from connection 153 to incrementer SBT; at the beginning of the last byte to be transmitted, however, it presents the counting code corresponding to the actual number of significant bits to be transmitted in this particular case.

The presence of the last byte is detected by a control circuit DUO, which receives the command code from bus 154 and the signalization of a new byte start-up on wire 160 from memory PTT. Circuit DUO, via a wire 167, commands a switching of multiplexer MSB to a bus 166, coming from register RMC, on which, as explained below, there is present in this case the code representing the number of bits of the residual character or truncated byte to be transmitted.

The operational logic network LWK further includes an incrementer SUC which receives on a bus 168 the number of consecutive bits at logic level "1" already sent out and on a wire 169 the logic value of the bit being transmitted. Incrementer SUC finally feeds to register RPT on a bus 170 the updated value of the number of consecutive bits of logic level "1" transmitted on the current channel. Also part of network LWK are circuits PPT, MSB, SBT, DUO and a register EXT.

At the end of each bit period the updated information relating to the current channel is stored by way of buses 155, 170, 164 and wire 165 in register RPT and is fed back to the input of multiplexer MIT through bus 151. If the processed bit is the last of the current channel, the updated information is supplied through bus 151 not to an input of this multiplexer but to the input of "vertical" shift-register assembly SVT where it is stored.

At the same time, bus 150 brings to the other multiplexer input the new output signal of circuit SVT, which is the state of the subsequent channel.

The writing and reading in shift-register assembly SVT is carried out in the aforementioned channel cycles by logic circuit CV3 which is directly controlled by the signals delivered by the time base.

The command code as well as the bytes to be transmitted arrive from block BTT on bus 83 whereas the corresponding writing commands arrive on connection 82.

Bus 83 carries, besides the command code or the byte, also the number of the channel to which these data pertain.

Two random-access memories MEO and MEC of 32 words (one per channel) store, respectively, the bytes and the command codes coming from block BTT on bus 83.

Memory MEO can be written both by block BTT and locally. The local writing serves only to clear the cell from which the byte to be transmitted has just been extracted. Analogously, memory MEC can be written locally as well as by block BTT. The local writing serves only to impose a command with the meaning of forced end of the message, upon the absence of a new byte to be transmitted (underrun).

Memories MEO and MEC are cyclically read at the beginning of each time slot, on the basis of a locally generated address, and their contents are stored in registers RMO and RMC, respectively.

The operational sequence of these memories is the following:

At the end of each time slot a counter CIM feeds to a bus 171 the code of the subsequent channel, by simply incrementing the code of the current channel present at its inputs on bus 65; at the same time, a logic circuit XRL, directly controlled by the time base, positions via a wire 173 a multiplexer MIO, so as to transfer onto an addressing bus 172 of memories MEO and MEC the code present on bus 171. Thus, at the beginning of a new time slot it is possible to read immediately in the two memories, storing in register RMO the byte arriving from the output of memory MEO through a bus 174 and in register RMC the command code coming from the output of memory MEC through a bus 175. After the reading operation, counter CIM decrements its contents so as to present again the code of the preceding channel in order to allow possible local writing of memories MEO and MEC, if necessary. In fact, if during the preceding time slot a byte has been extracted from register RMO, a logic circuit LSO discussed hereinafter emits on a wire 176 a cancellation command for the same byte in memory MEO; a logic circuit XSM uses the signal present on wire 176 to generate a writing pulse at its output connected by a wire 177 to multiplexer MIO. The latter transfers this pulse to the output connected to the writing input of memory MEO. Analogously, if during the preceding time slot an "underrun" has taken place, logic circuit LSO sends to a logic circuit FMA through a wire 179 a command of forced termination of the message. Logic FMA emits at an output lead 180 a command for logic circuit XSM which, in turn, generates at an output lead 181 a writing pulse arriving at memory MEC through multiplexer MIO and a wire 182. During this operation of local writing the data in the inputs of the memories are maintained at zero level.

Thereafter, logic circuit XRL commands through a wire 173 the switching of multiplexer MIO so that the addresses coming from block BTT through connection 83 are transferred onto bus 172; the writing commands coming from block BTT through connection 82 are transferred onto wires 178 and 182. Thus, block BTT can write into memories MEO and MEC the same data it presents on bus 83.

At the end of the time phase in which block BTT directly accesses these memories, counter CIM is updated with the value of the code of the current channel. At the end of the channel cycle, or time slot, the foregoing operations begin again in the order described.

We shall now explain the transmission of characters and the transmission of redundancies, of "flags" and of "stuffing" bits.

When a message is to be forwarded on a channel, block BTT writes into memory MEC the command code of "message transmission" by using the procedure discussed before. This command code is transferred to the register RMC at the beginning of the time slot. Through connection 154 the output signal of register RMC is fed to the operational logic network LWK. This network, having detected the transmission command, sets through connection 156 a multiplexer MFU so as to transfer to its output the signals present on wire 158. This wire, coming from PROM memory PPT, carries the bits forming the flag of message beginning generated on the basis of the internal state of logic network LWK relating to that channel.

Meanwhile logic circuit LSO, which through connections 155 and 187 respectively receives the code of the channel state before the aforedescribed operation on the bit and the code of updated state, emits on connection 64 to block BTT the first request for a byte to be transmitted. Memory PPT signals on wire 159 to logic XCT the beginning of a message.

The message transmission takes place with a procedure which uses circuits that are quite similar to those described in conjunction with message reception in block LVI (FIG. 5). These circuits comprise:

a "vertical" byte shift register SOT, identical with circuit SVO;

a "vertical" shift register SCT for CRC redundancies, identical with circuit SVC;

a multiplexer MCT with functions and structure equal to those of multiplexer MPP;

a register SHO, with an input multiplexer MQR, which generates a rightward shift of the byte, is identical with register SOO as to structure, but is different in the way it is loaded;

a register SHC, with an input multiplexer MQZ, which performs a rightward shift of a redundancy character through circuit EXT and is identical with register SOC which carries out the same function through circuit EXO;

logic circuits XCS and XCT, which control the preceding circuits in a manner analogous to that of logic circuit XCR;

a multiplexer MOT, which allows character writing into register SHO either from the outputs of register SOT or from the outputs of register RMO. This multiplexer has no counterpart in block LVI.

The operation of this circuitry generally conforms to that of the corresponding part of FIG. 5. Here, too, the information on the new channel is present at the outputs of circuits SOT and SCT and is sent to the remaining circuits on buses 184 and 193, respectively, at the beginning of each time slot. At the end of the time slot this information is sent again to the inputs of circuits SOT and SCT through buses 191 and 192.

Let us now describe the operation of these circuits relating to a channel neglecting the cyclical read-write operations of circuits SOT and SCT, commanded by a logic circuit CV4 which in turn is directly controlled by the time base, as are circuits CV1, CV2 and CV3.

When logic circuit XCT receives the signal of message beginning, as described above, it switches through a command on a wire 188 the multiplexer MCT onto a line 190 on which the predetermined code of initialization of the CRC word is always present. This code, transferred by the multiplexer to a bus 189, is written in register SHC.

Once the flag transmission is over, the first byte to be transmitted is to be available at the output of register RMO.

Memory PTT commands the transfer of this byte to register SHO through a bus 183, multiplexer MOT and a bus 185. For this purpose it emits on wire 160 a signal to circuits XCS and XCT. These two logic circuits position multiplexer MOT through wire 188 and multiplexer MQY through a wire 194 and emit an instruction of parallel writing in register SHO by a command on a wire 195. Meanwhile, on connection 156 the memory PTT switches a multiplexer MFU to a wire 196, which is connected to a serial output of register SHO, and, through connections 155 and 187, informs logic circuit LSO of the occurred transfer.

Logic circuit LSO generates the request for a new byte on connection 64 extending to block BTT. Logic circuit XCS carries out the rightward shift of the byte present in circuit SHO by means of commands on connection 156 generated in a PCM time slot by memory PPT. The successive bits, forwarded over wire 196, are carried to multiplexer MFU for transmission and to circuits EXT and SHC for the CRC computation.

The bits transmitted in this way, which are present at the output of multiplexer MFU, are retransferred by wire 169 to incrementer SUC which checks the number of consecutive bits of logic level "1".

Whenever this number attains the value five, the operational logic network LWK interrupts the serial transmission of the byte and switches the multiplexer MFU to wire 158 on which memory PPT forwards a logic "0" to line 2 (stuffing). It thereupon resumes the byte transmission.

The bits which are being transmitted are fed by wire 169 to a flip-flop SFU which synchronizes the bit flow with a clock pulse arriving from the time base. The outgoing PCM group is present at the output of flip-flop SFU connected to wire 2.

The operational logic network LWK counts the transmitted valid bits and, whenever it detects the occurred transmission of a complete byte, performs by the aforedescribed procedure the transfer of the new byte to be transmitted from register RMO to circuit SHO and sends the request signal for the new byte to logic circuit LSO.

When block BTT has transferred the last message byte to memory MEO, it responds to a further request for a byte, generated by logic LSO, by writing in memory MEC the command code of end of message and the number of valid bits contained in the last byte.

Logic network LWK finds this information on connections 154 and 166, originating at register RMC. Circuit DUO and incrementer SBT cause the communicated bit number to be transmitted through multiplexer MSB. At the end of this transmission, memory PPT sends to block BTT on wire 64 the end-of-message signal, as an acknowledgment, and switches through line 156 the multiplexer MFU to its input connected to wire 198, extending from the serial output of register SHC. This register now contains the CRC word which is to be transmitted at the end of the message.

Memory PPT sends on wire 157 a command to circuit EXT to interrupt the computing of the CRC word, which is forwarded bit by bit over wire 198.

Upon termination of transmission of the 16-bit CRC word, logic network LWK re-enters the flag-transmission state which it executes as described for the beginning of a message.

By a suitable command, sent through block BTT, block LMT can require block LVO to conclude the message without subsequent transmission of the CRC redundancies.

In this case the operational logic network LWK, at the end of the transmission of the last byte, directly generates the end flag. This is designed to provide a method of diagnosis of the logic circuitry through tests on a channel closed on itself in a loop.

Besides the commands already referred to, block BTT can write in memory MEC also the commands of "continuous flag transmission", "abort flag transmission" or "idle-state transmission". In these cases, the bits to be forwarded on the line always arrive from memory PPT through wire 158 and multiplexer MFU.

A register RIT in block LVO receives from block BTT on connection 83 the code of the channel whose state may have been requested by block LMT. When this register is loaded, its output signals are compared by a circuit CUT with the current channel code supplied by the time base on connection 65. In case of coincidence, the state present at the output of register SVT is forwarded to block BTT through a register LRT and bus 66. If the message can be accepted by block LMT, registers RLT and RIT are cleared; otherwise the message is maintained in register RLT and presented again at the subsequent frame. The commands for registers RLT and RIT arrive on connections 75, 82 and 76.

We claim:

1. In a communication system including a processor and a data line carrying a multiplicity of PCM channels having respective time slots allocated thereto in a recurrent frame, the combination therewith of a bidirectional interface interposed between said processor and said data line, said interface comprising:

input circuitry coupled to said data line for receiving bits of 32 incoming PCM channels therefrom;

output circuitry coupled to said data line for transmitting bits of 32 outgoing PCM channels thereto;

memory means having sectors individually assignable to incoming and outgoing channels for a temporary storage of bits thereof;

access means controlling communication between said memory means and a bus leading to said processor, said access means comprising a single transfer point for bidirectional transmission; and microprogrammed operating means for assigning, with time-division multiplexing, sectors of said memory means to incoming and outgoing channels and controlling the transfer of outgoing bits from said memory means to said output circuitry and of incoming bits from said input circuitry to said memory means in response to instructions from said processor, wherein said microprogrammed operating means comprises a read-only memory containing microprograms conforming to different protocols and manually settable switch means for selecting one of said microprograms to control the transfer of incoming and outgoing bits, and thereby routing same bidirectionally without transfer to a memory of said microprocessor to a predetermined number of bits in each time slot forming a word which is part of an incoming or outgoing message, said operating means including counting means for determining the number of bits during a given time slot in an assigned sector of said memory means, said operating means further including logic means for recognizing signals marking the beginning and the end of a message and reporting same to the processor, said input and output circuitries each comprising an operational logic network controlled by a local time base for registering, during processing of a given channel, a state word relating to such channel and updating said state word in each bit period of a time slot allocated thereto, with transmission of the updated state word to the processor at the end of each time slot.

2. The combination defined in claim 1 wherein said logic network includes a programmable read-only memory loadable with a new bit in each bit period, a state register loadable by said programmable memory, and a feedback connection extending from said state register to said programmable memory.

3. The combination defined in claim 2 wherein said logic network further includes a logic circuit in cascade with said programmable memory, said logic circuit being switchable during certain time slots of a frame to prevent the generation of a state word.

4. The combination defined in claim 1 wherein said input and output circuitries each further comprise shift-register means with a feedback loop for assembling consecutive bits of a time slot into a byte and comparison means connected to said shift-register means for ascertaining an identity of the assembled byte with a predetermined redundancy code.

5. The combination defined in claim 1 wherein said access means includes a plurality of FIFO registers loadable in cascade from said memory means, a source of interrupt commands responsive to corresponding instructions from said processor and to output signals of certain of said FIFO registers, control means responsive to other instructions from said processor for loading and unloading said FIFO registers, and gating means operable by said control means to pass writing and reading addresses to said memory means.

6. The combination defined in claim 5 wherein said registers include a message register, an interrupt register and a sector register only readable by the processor and a command register only writable by the processor.

7. The combination defined in claim 6 wherein said memory means and the registers readable by the processor are provided with common output means connected to said bus.

8. The combination defined in claim 1, further comprising buffer means connected to said input circuitry for preliminary storage of additional messages arriving during processing of a current message.

9. The combination defined in claim 8 wherein said buffer means comprises a plurality of FIFO buffers.

* * * * *